United States Patent
Bolling

(10) Patent No.: US 10,003,398 B2
(45) Date of Patent: Jun. 19, 2018

(54) SYSTEMS AND METHODS TO FORMAT AND ENCODE AVIATION DATA FOR IMPROVED TRANSMITTABILITY

(71) Applicant: GE Aviation Systems LLC, Grand Rapids, MI (US)

(72) Inventor: Randy E. Bolling, Odessa, FL (US)

(73) Assignee: GE AVIATION SYSTEMS LLC, Grand Rapids, MI (US)

(*) Notice: Subject to any disclaimer, the term of this patent is extended or adjusted under 35 U.S.C. 154(b) by 61 days.

(21) Appl. No.: 15/000,245

(22) Filed: Jan. 19, 2016

(65) Prior Publication Data

US 2017/0207848 A1 Jul. 20, 2017

(51) Int. Cl.
*H04B 7/185* (2006.01)
*H04L 29/08* (2006.01)

(52) U.S. Cl.
CPC ......... *H04B 7/18506* (2013.01); *H04L 67/12* (2013.01); *H04L 69/324* (2013.01)

(58) Field of Classification Search
CPC .... H04B 7/18506; H04L 67/12; H04L 69/324
See application file for complete search history.

(56) References Cited

U.S. PATENT DOCUMENTS

| | | | | |
|---|---|---|---|---|
| 2002/0047930 A1* | 4/2002 | Zhou | ...................... | H04N 7/012 348/578 |
| 2006/0026185 A1* | 2/2006 | Lykken | .................... | H03M 7/30 |
| 2013/0050486 A1* | 2/2013 | Omer | ............... | H04N 21/23614 348/144 |
| 2013/0208111 A1* | 8/2013 | Kidd | ...................... | B64D 45/00 348/143 |
| 2016/0165193 A1* | 6/2016 | Rasheed | .............. | G06K 9/3241 348/143 |

FOREIGN PATENT DOCUMENTS

| | | |
|---|---|---|
| EP | 1 766 784 A1 | 3/2007 |
| EP | 2 258 055 A1 | 12/2010 |
| WO | 2006/011141 A2 | 2/2006 |

OTHER PUBLICATIONS

Combined Search and Examination Report issued in connection with corresponding GB Application No. 1700607.3 dated Aug. 3, 2017.

* cited by examiner

*Primary Examiner* — Jae Y Lee
(74) *Attorney, Agent, or Firm* — General Electric Company; William Scott Andes

(57) ABSTRACT

Systems and methods for encoding aviation data for improved transmittability are provided. One example system includes one or more processors and a computer-readable medium that stores instructions that when executed by one or more processors cause the one or more processors to obtain a plurality of aviation datasets that respectively describe a plurality of conditions associated with an aircraft; and format the plurality of aviation datasets into a plurality of video frames. Each of the plurality of video frames includes a plurality of encoding units at respective positions within such video frame. To format the plurality of aviation datasets into the plurality of video frames, the one or more processors format at least a portion of each of the plurality of aviation datasets as at least one of the plurality of encoding units within each video frame. For each of the plurality of aviation datasets, the at least one encoding unit within each video frame is at a same respective position from frame to frame.

14 Claims, 5 Drawing Sheets

SYSTEMS AND METHODS TO FORMAT AND ENCODE AVIATION DATA FOR IMPROVED TRANSMITTABILITY

FIELD OF THE INVENTION

The present subject matter relates generally to aircraft data handling, and more particularly to systems and methods for formatting and encoding aviation data for improved transmittability.

BACKGROUND OF THE INVENTION

Vast quantities of data related to aircraft conditions, performance tracking, or health monitoring for aircraft are generally available. Analysis of such aviation data can offer useful information for maintenance, prognostics, control, routing, and/or other objectives of the aircraft.

For example, modern aircraft are equipped with a large number of different computers that provide a wide range of control functions and that output various data. Aircraft may also have a large number of sensors that provide data regarding various conditions associated with the aircraft, including vibrational data, engine data, wind data, or other forms of aircraft condition data. Thus, modern aircraft typically output a very large amount of data.

As a result of the significant magnitude of such data, real-time or even post-flight transmission of such data from the aircraft to a ground station represents a significant challenge. For example, in-flight transmission of large amounts of data is relatively costly or otherwise impractical under current technology. Likewise, situations in which an aircraft is docked at an airport gate may not provide sufficient time for the data to be transmitted and processed and then for action to be taken in view of the processed data.

Thus, the potential benefits obtainable through analysis of aviation data are not currently achieved due to a lack of ability to transmit the aviation data from the aircraft to a ground station.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to a computer-implemented method for encoding aviation data. The method includes obtaining, by one or more processors, a first plurality of aviation datasets. The first plurality of aviation datasets are respectively descriptive of a plurality of conditions associated with an aircraft at a first time. The method includes formatting, by the one or more processors, the first plurality of aviation datasets as a first data frame. The first data frame includes a first plurality of encoding units that have respective positions within the first data frame. Each of the first plurality of aviation datasets is formatted as at least one of the first plurality of encoding units. The method includes obtaining, by the one or more processors, a second plurality of aviation datasets. Each of the second plurality of aviation datasets corresponds to one of the first plurality of aviation datasets. The second plurality of aviation datasets respectively describe the plurality of conditions associated with the aircraft at a second time that is subsequent to the first time. The method includes formatting, by the one or more processors, the second plurality of aviation datasets as a second data frame. The second data frame includes a second plurality of encoding units that have the respective positions within the second data frame. Each of the second plurality of aviation datasets is formatted as at least one of the second plurality of encoding units that has a same respective position as the corresponding at least one first encoding unit into which the corresponding first aviation dataset was formatted. The method includes encoding, by the one or more processors, the first data frame and the second data frame according to an encoding technique.

Another example aspect of the present disclosure is directed to a system for encoding aviation data. The system includes at least one data formatting processor and a first non-transitory computer-readable medium that stores instructions that when executed by the at least one data formatting processor cause the data formatting processor to perform operations. Execution of the instructions causes the one or more processors to obtain a first plurality of aviation datasets that respectively describe a plurality of conditions associated with an aircraft at a first time. Execution of the instructions causes the one or more processors to format the first plurality of aviation datasets as a first data frame. The first data frame includes a first plurality of encoding units that have respective positions within the first data frame. Each of the first plurality of aviation datasets is formatted as at least one of the first plurality of encoding units. Execution of the instructions causes the one or more processors to obtain a second plurality of aviation datasets. Each of the second plurality of aviation datasets corresponds to one of the first plurality of aviation datasets. The second plurality of aviation datasets respectively describe the plurality of conditions associated with the aircraft at a second time that is subsequent to the first time. Execution of the instructions causes the one or more processors to format the second plurality of aviation datasets as a second data frame. The second data frame includes a second plurality of encoding units that have the respective positions within the second data frame. Each of the second plurality of aviation datasets is formatted as at least one of the second plurality of encoding units that has a same respective position as the corresponding at least one first encoding unit into which the corresponding first aviation dataset was formatted.

Another example aspect of the present disclosure is directed to a non-transitory computer-readable medium that stores instructions that when executed by one or more processors cause the one or more processors to perform operations. Execution of the instructions causes the one or more processors to obtain a plurality of aviation datasets that respectively describe a plurality of conditions associated with an aircraft. Execution of the instructions causes the one or more processors to format the plurality of aviation datasets into a plurality of video frames. Each of the plurality of video frames includes a plurality of encoding units at respective positions within such video frame. To format the plurality of aviation datasets into the plurality of video frames, the one or more processors format at least a portion of each of the plurality of aviation datasets as at least one of the plurality of encoding units within each video frame. For each of the plurality of aviation datasets, the at least one encoding unit within each video frame is at a same respective position from frame to frame.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
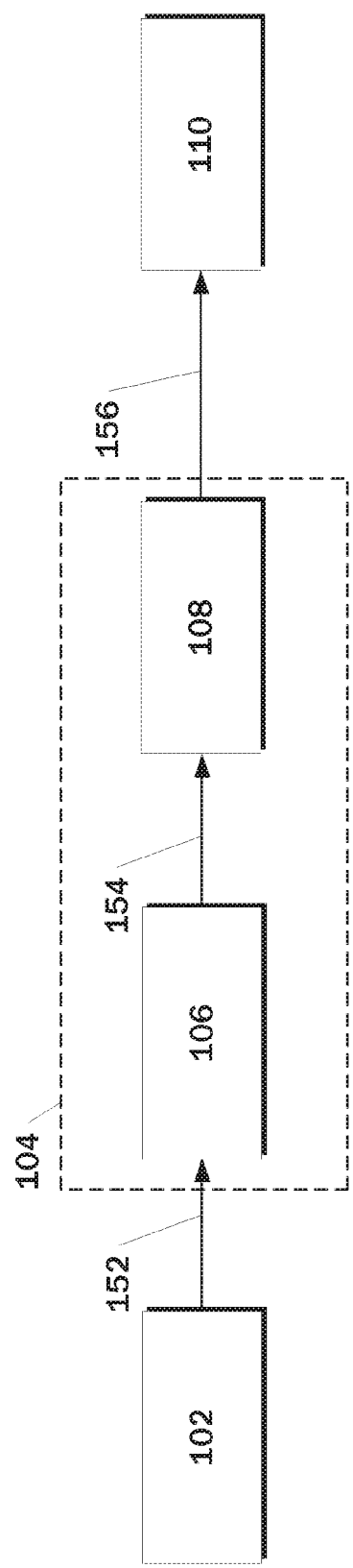
FIG. 1 depicts an overview of an example aviation data formatting and encoding system according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods for encoding aviation data for improved transmittability. One example system obtains a plurality of aviation datasets that respectively describe a plurality of conditions associated with an aircraft. For example, the plurality of aviation datasets can be various types of full flight engine data. The system then formats the plurality of aviation datasets into a plurality of data frames. For example, the plurality of aviation datasets can be formatted into video frames, such as video frames in accordance with the MPEG-2 video encoding technique. The video frames can then be encoded according to an existing video encoding technique (e.g., MPEG-2). Formatting and encoding the aviation data in such fashion can result in significant compression gains (e.g., greater than ninety percent), thereby greatly increasing the ability to quickly and efficiently transmit the aviation data (e.g., from the aircraft to a ground station during flight).

More particularly, the systems and methods of the present disclosure can receive or otherwise obtain aviation datasets that are respectively output by various computers, sensors, or other components of the aircraft. The aviation datasets can respectively describe different conditions associated with the aircraft, including, for example, vibrational data, engine data (e.g., oil pressure, engine speed, etc.), full flight data, wind data, or any other aircraft data.

In some implementations, the aviation datasets can be received by the systems of the present disclosure via a maintenance bus of the aircraft. For example, the aircraft may have an integrated modular avionics architecture in which various aircraft control and/or computer modules and/or sensors output data via a system bus. In some implementations, the systems of the present disclosure can be included within or in communication with a flight-data acquisition unit, a quick access recorder, and/or a flight data recorder of the aircraft to receive the aviation datasets.

In some implementations, the aviation datasets can variously take the form of discrete, analog, and/or digital parameters. For example, an aviation dataset can be or otherwise describe a digital signal that has a number of samples.

As one example, a particular example aviation dataset can be received as at least a portion of incoming aviation data frames, with thirty seconds to one minute between consecutive aviation data frames. Each frame can be approximately 0.5 megabytes in size and can contain a number of data elements. For example, each data element can commonly be 32 bits long and can be formatted according to the IEEE Standard for Floating Point Arithmetic. In other instances, elements can be 8 bits, 16 bits, 64 bits, etc.

The systems of the present disclosure can format the plurality of aviation datasets into a plurality of formatted data frames, such as, for example, video frames. As an example, a particular example video frame can include a number of rows of pixels. Each pixel can be described by three bytes of data (e.g., 24 bits). The three bytes would typically respectively describe a luma or luminance component, a blue-difference chroma component, and a red-difference chroma component. In some implementations, the length of each row can be between 352 to 1920 pixels long.

According to an aspect of the present disclosure, each of the plurality of data frames can include a plurality of encoding units at respective positions within such video frame. For example, the encoding units may be rows, blocks (e.g., 8×8 blocks), or macroblocks (e.g., 16×16 macroblocks) of the data frame. Thus, the encoding units can be designated portions of each frame which have repeating positions from frame to frame.

To format the plurality of aviation datasets into the plurality of data frames, the systems and methods of the present disclosure can format at least a portion of each of the plurality of aviation datasets as at least one of the plurality of encoding units within each video frame. Furthermore, for each of the plurality of aviation datasets, the at least one encoding unit within each video frame is at a same respective position from frame to frame. For example, a portion of a first dataset can be formatted into the first row of each of the data frames, while a portion of a second dataset can be formatted into the second row of each of the data frames, and so forth.

In such way, the resulting data frames can be encoded using encoding techniques which leverage motion estimation compression. More particularly, many of the aviation datasets will typically exhibit some sinusoidal behavior or otherwise may have periodically repeating portions. As one example, various aviation datasets may typically exhibit a carrier wave with a period that is influenced by the engine speed (e.g., engine RPM) of the aircraft. Thus, due to the repeating nature of the aviation datasets and their placement at consistent respective positions within each frame, aviation data formatted as discussed above (e.g., as video frames) can be encoded according to various encoding techniques which leverage motion estimation compression to provide large compression gains, such as, for example, an MPEG-1 encoding technique, an MPEG-2 encoding technique, a JPEG encoding technique, an MP3 encoding technique, an MP4 encoding technique, and an MPEG-4 encoding technique.

Thus, although aspects of the present disclosure are discussed with reference to formatting of aviation data as video frames and encoding of video frames using a video encoding technique, the present disclosure is not limited to video encoding techniques. Instead, various different compression techniques, including audio encoding techniques, image encoding techniques, or other encoding techniques can be used without departing from the scope of the present disclosure.

According to another aspect of the present disclosure, the systems and methods disclosed herein can recognized a repeating point or period for one or more of the aviation datasets. For example, as noted above, many of the aviation datasets will typically exhibit some sinusoidal behavior or otherwise may have periodically repeating portions. As such, in some implementations, the repeating point or period can be used as an encoding unit reset and/or a frame reset. Thus, when a repeating point or period is reached within a particular dataset, the systems and methods can advance to formatting the next aviation dataset within the same frame and/or advance to formatting the same dataset within a next consecutive frame.

As one example, the systems and methods of the present disclosure can determine at least a first period exhibited by at least a first dataset of the plurality of aviation datasets and parse the first dataset according to the first period to obtain a plurality of first subsets. The plurality of first subsets can be respectively formatted within the plurality of video frames, such that each video frame contains a respective one of the plurality of first subsets. In such fashion, each frame can contain one period or other repeating portion of the first aviation dataset, thereby enabling even greater compression gains as the subsets will have increased matching from frame to frame.

In some implementations, a period is determined for each aviation dataset as described above. In other implementations, a single period is determined for the aviation datasets as a whole and all aviation datasets are parsed according to such period.

According to another aspect, in some implementations, the systems and methods of the present disclosure, can supplement one or more aviation datasets with filler data in order to complete an encoding unit into which such dataset is formatted. For example, if when formatting a portion of a dataset into a particular encoding unit, the portion being formatted concludes prior to the completion of the encoding unit, then the remainder of the encoding unit can be formatted with filler data. For example, the filler data can be a string of zeros, a string of ones, or some other predetermined data. As an example, if a first dataset is formatted into a first row, and the end of the first dataset is reached prior to the completion of the first row, then the remainder of the first row can be completed with filler data. In such fashion, breaks between formatted datasets can occur coincident with breaks between encoding units and/or frames.

According to the various techniques described above, example aspects of the present disclosure can have a technical effect of formatting aviation data into a plurality of frames suitable for compression by an encoding technique. For example, the frames can be formatted for compression by a lossy video compression algorithm (e.g., MPEP-2) that is available nearly universally on off-the-shelf personal computers, embedded processors, and video systems. Most lossy compression is computationally intensive, and the lossy compression techniques described above are no less computationally intensive. However, formatting of aviation data according to video compression standards takes advantage of specialty designed hardware that has been added to recent processors for performing a particular type of lossy data compression (e.g., MPEG-2). Thus, aspects of the present disclosure enable aviation data to be treated as video data by an off-the-shelf or otherwise low cost compression processor and associated components.

The advantage of well formatted lossy compression lies in its ability to remove greater than ninety percent of the original content and reproduce an output that adequately represents the original data stream enough to preserve the critical high frequency components. Further, the compression gains enabled by the present disclosure are sufficient to allow real-time and cost effective transmission of the entire flight of data under current technological constraints.

Although example aspects of the present disclosure are discussed with reference to aviation data and other avionic systems associated with an aircraft for purposes of illustration and discussion, the subject matter described herein can be used with other vehicles, machines, mechanical assets, or other systems without deviating from the scope of the present disclosure.

With reference now to the Figures, example aspects of the present disclosure will be discussed in further detail.

FIG. 1 depicts an overview of an example aviation data formatting and encoding system 104 according to example embodiments of the present disclosure. The aviation data formatting and encoding system 104 includes one or more formatting processors 106 and one or more encoding processors 108.

The one or more formatting processors 106 can receive a plurality of aviation datasets 152 from one or more components 102 of an aircraft. For example, the aviation datasets 152 can be received via a maintenance bus of the aircraft.

In some implementations, the aviation datasets 152 can variously take the form of discrete, analog, and/or digital parameters. For example, an aviation dataset 152 can be or otherwise describe a digital signal that has a number of samples.

As one example, a particular example aviation dataset 152 can be received as at least a portion of incoming aviation data frames, with thirty seconds to one minute between consecutive aviation data frames. Each frame can be approximately 0.5 megabytes in size and can contain a number of data elements. For example, each data element can commonly be 32 bits long and can be formatted according to the IEEE Standard for Floating Point Arithmetic. In other instances, elements can be 8 bits, 16 bits, 64 bits, etc.

Assuming a maximum flight duration of 24 hours with 0.5 megabyte aviation data frames received every thirty seconds, a maximum full flight data size can equal 1,440 megabytes. Assuming a typical flight duration of 3 hours with 0.5 megabyte aviation data frames received every thirty seconds, a typical full flight data size can equal 180 megabytes.

The one or more formatting processors 106 can format the plurality of aviation datasets 152 into a plurality of formatted data frames 154, such as, for example, video frames. As one example, a particular example video frame can include a number of rows of pixels. Each pixel can be described by three bytes of data (e.g., 24 bits). The three bytes would typically respectively describe a luma or luminance component, a blue-difference chroma component, and a red-difference chroma component. In some implementations, pixels may also each have 30 bits of data. In some implementations, the length of each row can be between 352 to 1920 pixels long.

According to an aspect of the present disclosure, each of the plurality of data frames can include a plurality of encoding units at respective positions within such video frame. For example, the encoding units may be rows, blocks (e.g., 8×8 blocks), or macroblocks (e.g., 16×16 macroblocks) of the data frame. Thus, the encoding units can be designated portions of each frame which have repeating positions from frame to frame.

To format the plurality of aviation datasets 152 into the plurality of data frames 154, the one or more formatting processors 104 can format at least a portion of each of the plurality of aviation datasets 152 as at least one of the plurality of encoding units within each data frame 154. Furthermore, for each of the plurality of aviation datasets 152, the at least one encoding unit within each data frame 154 is at a same respective position from frame to frame. For example, consecutive portions of a first dataset can be formatted into the first row of each of the data frames 154, while consecutive portions of a second dataset can be formatted into the second row of each of the data frames 154, and so forth.

The one or more encoding processors 108 can encode the resulting data frames 154 using encoding techniques, including encoding techniques which leverage motion estimation compression. More particularly, many of the aviation datasets 152 will typically exhibit some sinusoidal behavior or otherwise may have periodically repeating portions. As one example, various aviation datasets 152 may typically exhibit a carrier wave with a period that is influenced by the engine speed (e.g., engine RPM) of the aircraft. Thus, due to the repeating nature of the aviation datasets 152 and their placement at consistent respective positions within each frame 154, aviation data formatted as discussed above (e.g., as video frames) can be encoded according to various encoding techniques that provide large compression gains, such as, for example, an MPEG-1 encoding technique, an MPEG-2 encoding technique, a JPEG encoding technique, an MP3 encoding technique, an MP4 encoding technique, and an MPEG-4 encoding technique.

The one or more encoding processors 108 can provide the encoded data frames 156 to a data transmitter 110. The data transmitter 110 can transmit the data frames 156 from the aircraft to a ground station. The ground station can decode the data frames 156 and receive the aviation data 152. In some implementations, the data transmitter 110 can be a component of or in communication with an aircraft communications addressing and reporting system.

Figure 2:
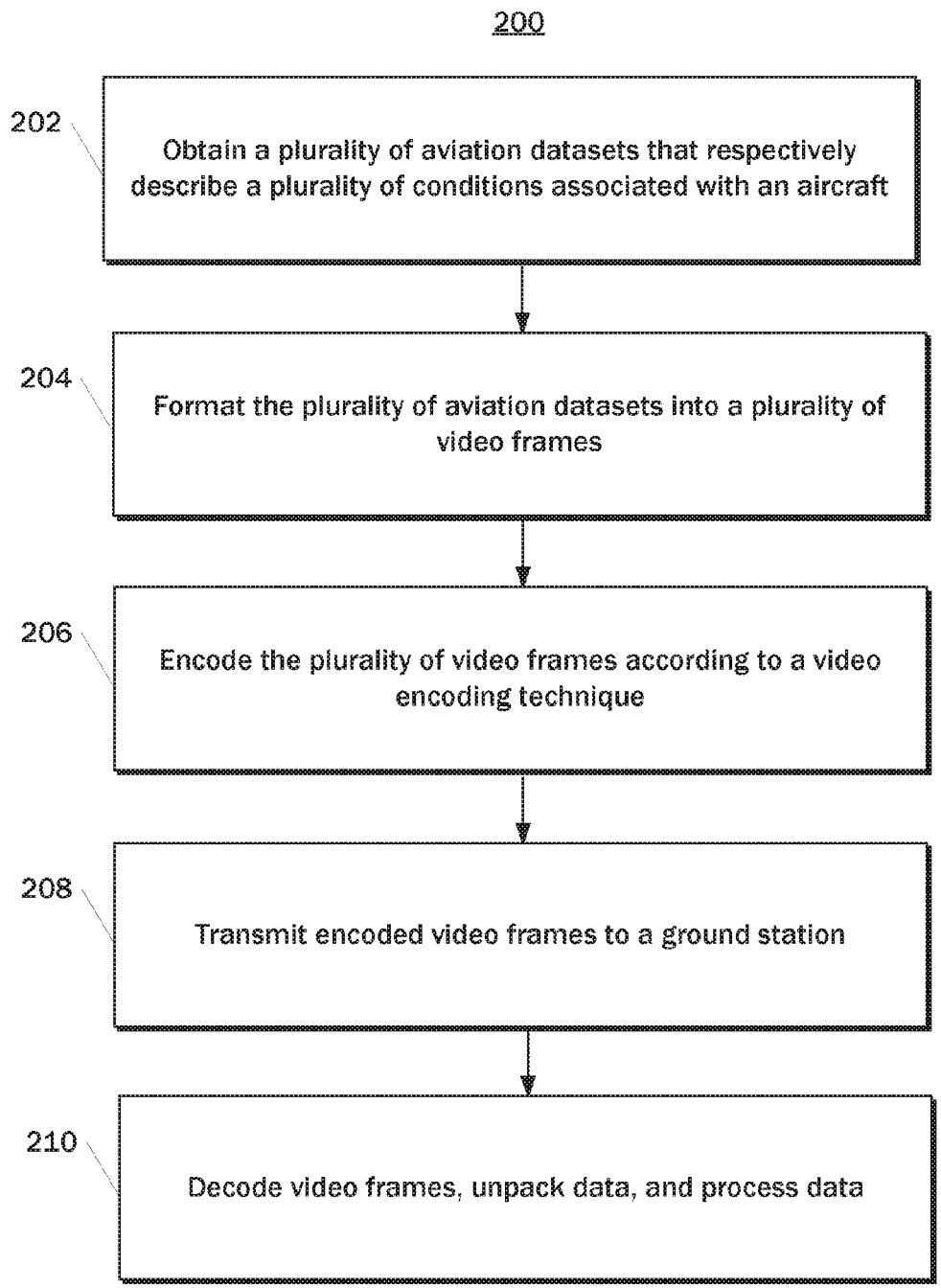
FIG. 2 depicts a flow chart diagram of an example method to format and encode aviation data according to example embodiments of the present disclosure.

FIG. 2 depicts a flow chart diagram of an example method 200 to format and encode aviation data according to example embodiments of the present disclosure.

At 202, a data formatting processor obtains a plurality of aviation datasets that respectively describe a plurality of conditions associated with an aircraft. For example, the plurality of aviation datasets can be received from a maintenance bus. The plurality of conditions can be any conditions associated with the aircraft including vibrational data, wind data, engine data, sensor data, or any other aircraft data.

At 204, the data formatting processor formats the plurality of aviation datasets into a plurality of video frames. In particular, in some implementations, each of the plurality of video frames can include a plurality of encoding units at respective positions within such frame. The encoding units can be rows, blocks, macroblocks, or other designated portions of the frame.

Figure 3:
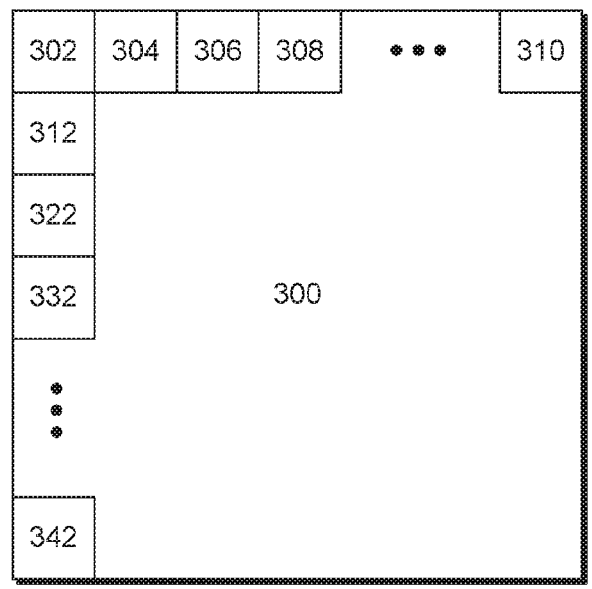
FIG. 3 depicts an example data frame according to example embodiments of the present disclosure.

As one example, FIG. 3 depicts an example data frame 300 according to example embodiments of the present disclosure. The data frame 300 includes a number of encoding units including 302, 304, 306, 308, 310, 312, 322, 332, and 342. As illustrated in FIG. 3, the encoding units can be blocks (e.g., 8×8 blocks of pixels) or macroblocks (e.g., 16×16 blocks of pixels). The encoding units have designated positions within the frame 300.

Referring again to FIG. 2, in some implementations, to format the plurality of aviation datasets into the plurality of video frames at 204, the data formatting processor formats at least a portion of each of the plurality of aviation datasets as at least one of the plurality of encoding units within each video frame. In addition, in some implementations, for each of the plurality of aviation datasets, the at least one encoding unit within each video frame is at a same respective position from frame to frame. Thus, the datasets can be placed in a same order and/or relative positioning from frame to frame.

Figure 4:
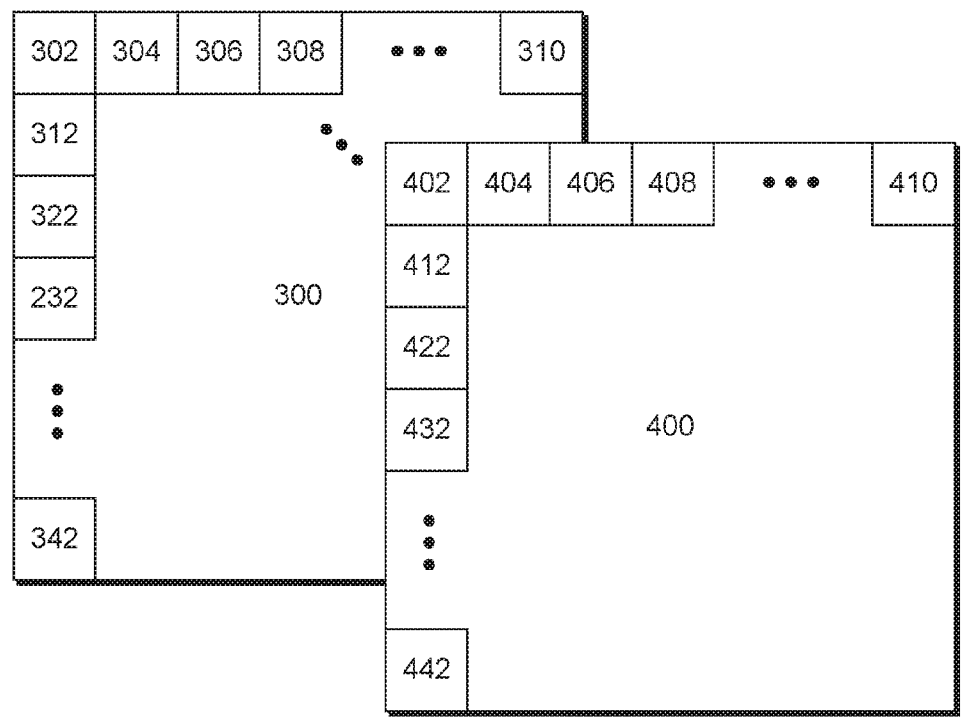
FIG. 4 depicts an example pair of consecutive data frames according to example embodiments of the present disclosure.

As one example, FIG. 4 depicts an example pair of consecutive data frames 300, 400 according to example embodiments of the present disclosure. The frame 300 is as illustrated in FIG. 3. The frame 400 is a next consecutive frame after the frame 300. The frame 400 includes encoding units 402, 404, 406, 408, 410, 412, 422, 432, and 434. The encoding units of frame 400 have the same positions within frame 400 as the encoding units of frame 300 have within frame 300. More particularly, each of the encoding units of frame 400 corresponds to one of the encoding units of frame 300. As one example, encoding unit 404 of frame 400 corresponds to encoding unit 304 of frame 300. That is, encoding unit 404 has the same position within frame 400 as encoding unit 304 has within frame 300.

As noted above, in some implementations, for each of the plurality of aviation datasets, the at least one encoding unit into which such dataset is encoded within each video frame is at a same respective position from frame to frame. As one example, a first dataset can be formatted into encoding units 302 and 304 of frame 300 and also encoding units 402 and 404 of frame 400, while a second dataset can be formatted into encoding units 306 and 308 of frame 300 and also encoding units 406 and 408 of frame 400, and so forth.

Referring again to FIG. 2, at 206, a data encoding processor encodes the plurality of video frames according to a video encoding technique. For example, the video encoding technique can be a technique that leverages motion estimation compression (e.g., MPEG-2).

At 208, a data transmitter of the aircraft transmits the encoded video frames to a ground station. The transmission at 208 can be performed during flight and/or after the conclusion of a flight when the aircraft is stationed within an airport.

At 210, the ground station decodes the video frames, unpacks the data, and processes the data to determine various characteristics of the aircraft. For example, processing the aviation data can offer useful information for maintenance, prognostics, control, routing, and/or other objectives of the aircraft. As one example, aviation data that describes current wind conditions can be analyzed to determine a flight trajectory change and then the flight trajectory change can be uploaded to the aircraft.

Figure 5:
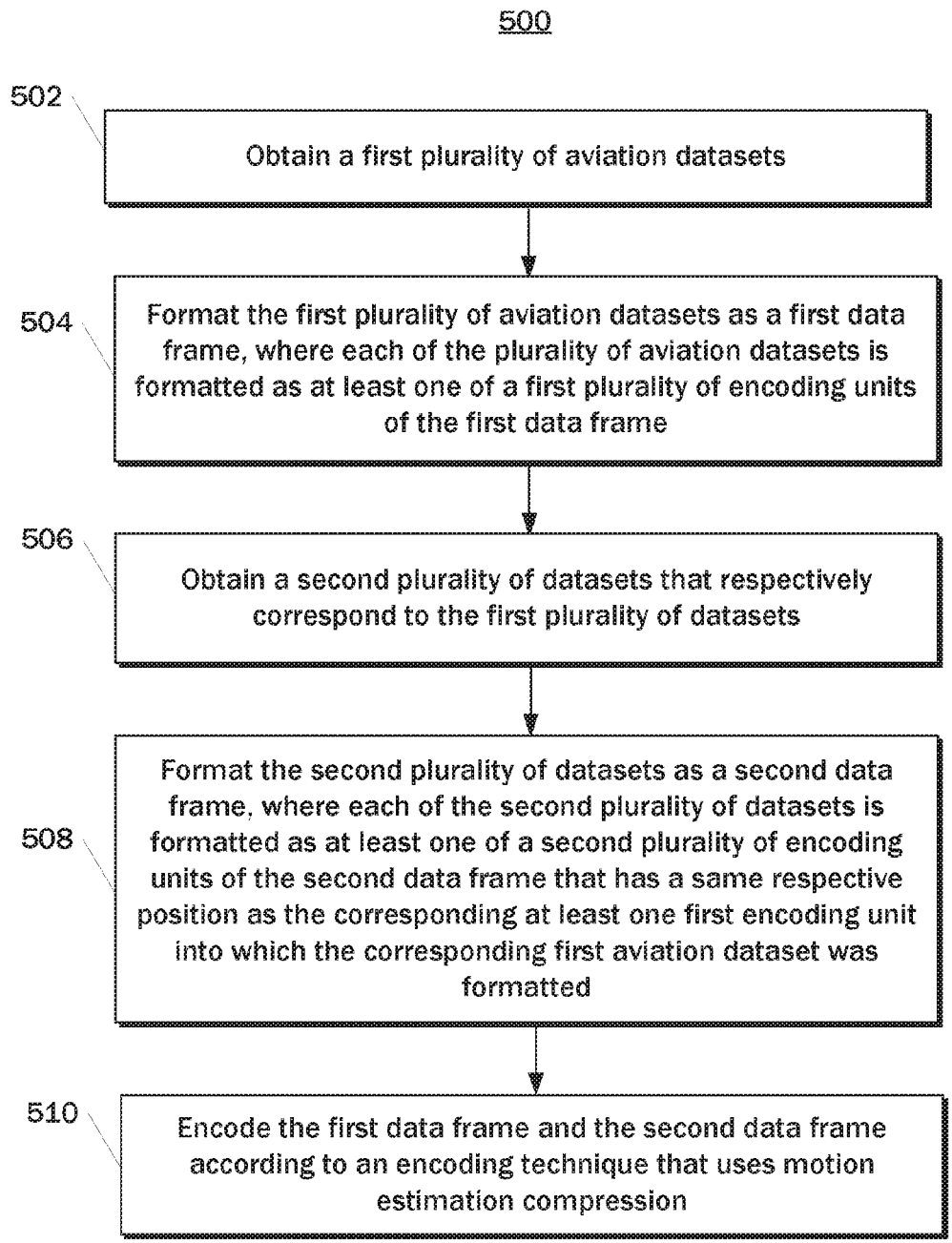
FIG. 5 depicts a flow chart diagram of an example method to format and encode aviation data according to example embodiments of the present disclosure.

FIG. 5 depicts a flow chart diagram of an example method 500 to format and encode aviation data according to example embodiments of the present disclosure.

At 502, an aviation data formatting and encoding system obtains a first plurality of aviation datasets. The first plurality of aviation datasets can respectively describe a plurality of conditions associated with an aircraft at a first time.

At 504, the system formats the first plurality of aviation datasets as a first data frame. The first data frame can include a plurality of encoding units that have respective positions within the first data frame. Each of the plurality of aviation datasets can be formatted as at least one of the first plurality of encoding units of the first data frame.

At 506, the system obtains a second plurality of datasets. Each of the second plurality of aviation datasets can correspond to one of the first plurality of aviation datasets (e.g., describe the same condition). Thus, for example, the second plurality of aviation datasets can respectively describe the plurality of conditions associated with the aircraft at a second time that is subsequent to the first time.

At 508, the system formats the second plurality of datasets as a second data frame. The second data frame can include a second plurality of encoding units that have the respective positions within the second data frame. Each of the second plurality of aviation datasets is formatted as at least one of the second plurality of encoding units that has a same respective position as the corresponding at least one first encoding unit into which the corresponding first aviation dataset was formatted.

At 510, the system encodes the first data frame and the second data frame according to an encoding technique. For example, the encoding technique can be an encoding technique that uses motion estimation compression. As examples, at 510, the system can encode the first data frame and the second data frame according to at least one of an MPEG-1 encoding technique, an MPEG-2 encoding technique, a JPEG encoding technique, an MP3 encoding technique, an MP4 encoding technique, and an MPEG-4 encoding technique.

According to an aspect of the present disclosure, in some implementations, the method 500 can further include determining at least a first period exhibited by at least a first dataset of the first plurality of aviation datasets. In such implementations, obtaining the second plurality of aviation datasets at 506 can include parsing the first dataset according to the first period to form a second dataset, the second dataset included in the second plurality of aviation datasets.

According to another aspect of the present disclosure, in some implementations, the method 500 can further include determining a period exhibited by the first plurality of aviation datasets based at least in part on a speed of an engine of the aircraft. In such implementations, obtaining the second plurality of aviation datasets at 506 can include parsing the first plurality of aviation datasets according to the period to form the second plurality of aviation datasets.

In some implementations, formatting the first plurality of aviation datasets at 504 can include supplementing a first dataset of the first plurality of datasets with filler data to complete a first encoding unit of the first plurality of encoding units into which the first dataset is formatted.

Figure 6:
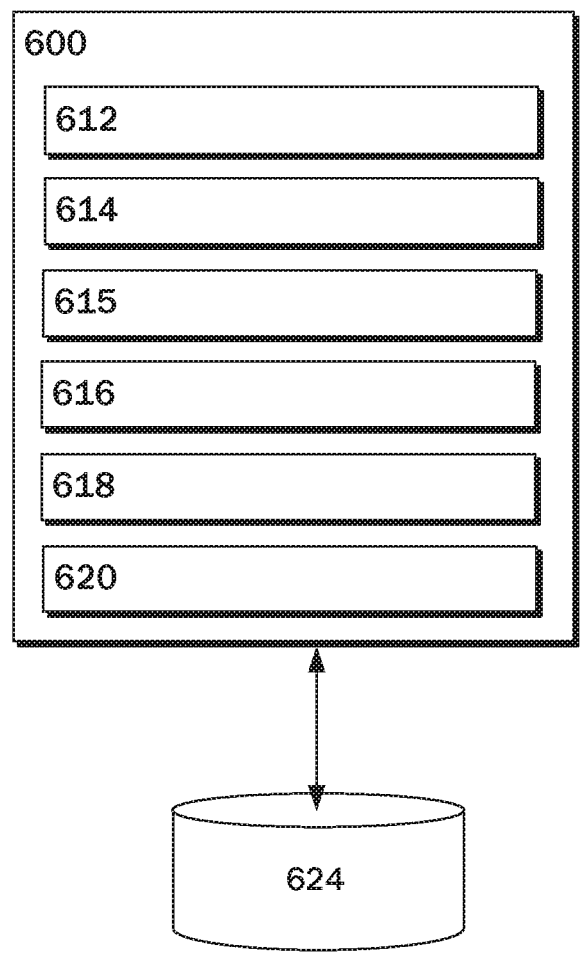
FIG. 6 depicts a block diagram of an example aviation data formatting system according to example embodiments of the present disclosure.

FIG. 6 depicts a block diagram of an example aviation data formatting and encoding system 600 according to example embodiments of the present disclosure. The system 600 can operate to implement aspects of the present disclosure, including obtaining and formatting aviation data.

The aviation data formatting and encoding system 600 includes one or more processor(s) 612 and one or more memory devices 614. The one or more processor(s) 612 can include any suitable processing device, such as a microprocessor, microcontroller, integrated circuit, logic device, one or more central processing units (CPUs), and/or other processing devices. In some implementations the one or more processor(s) 612 can include at least one data formatting processor and at least one data encoding processor.

The one or more memory devices 614 can include one or more non-transitory computer-readable media, including, but not limited to, RAM, ROM, firmware, hard drives, flash drives, or other memory devices. In some examples, memory devices 614 can correspond to coordinated databases that are split over multiple locations.

The one or more memory devices 614 store information accessible by the one or more processors 612, including instructions that can be executed by the one or more processors 612. For instance, memory device 614 or other components of the system 600 can store instructions for performing various functions disclosed herein (e.g., methods 200 and/or 500).

The aviation data formatting system 600 can further include a data collector 615, a data formatter 616, a data encoder 618, and a data transmitter 620.

The data collector 615 can receive or otherwise obtain aviation datasets that respectively describe conditions at an aircraft. For example, the data collector 615 can monitor a maintenance bus to collect the aviation data. The data collector 615 can sort the received data into respective datasets that respectively describe the conditions. For example, the data collector 615 can manage a database 624 that stores the aviation data.

The data formatter 616 can format the aviation datasets into a plurality of data frames, such as, for example, video frames. The data formatter 616 can perform some or all of methods 200 of FIG. 2 and method 500 of FIG. 5 to format the aviation data. The formatted frames can be stored in memory 614 or in the database 624.

The data encoder 618 can encode the data frames according to one or more various encoding techniques. The encoded frames can be stored in memory 614 or in the database 624. The data transmitter 620 can transmit the encoded frames from the aircraft to a ground station.

Each of the data collector 615, the data formatter 616, the data encoder 618, and the data transmitter 620 include computer logic utilized to provide desired functionality. Thus, each of the data collector 615, the data formatter 616, the data encoder 618, and the data transmitter 620 can be implemented in hardware, application specific circuits, firmware and/or software controlling a general purpose processor. In one embodiment, each of the data collector 615, the data formatter 616, the data encoder 618, and the data transmitter 620 are program code files stored on a storage device, loaded into memory and executed by a processor or can be provided from computer program products, for example computer executable instructions, that are stored in a tangible computer-readable storage medium such as RAM, hard disk or optical or magnetic media. The data collector 615, the data formatter 616, the data encoder 618, and the data transmitter 620 can each correspond to one or more different programs, files, circuits, or sets of instructions. Likewise, two or more of the data collector 615, the data formatter 616, the data encoder 618, and the data transmitter 620 can be combined into a single program, file, circuit, or set of instructions.

The data transmitter 620 can include any components or configuration suitable for communication with other computing devices over a network, including, for example, one or more ports, transmitters, wireless cards, controllers, physical layer components, or other items for communication according to any currently known or future developed communications protocol or technology, including aircraft to ground communications technologies.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

It will be appreciated that the computer-executable algorithms and techniques described herein can be implemented in hardware, application specific circuits, firmware and/or software controlling a general purpose processor. In one embodiment, the algorithms or computer-implemented techniques are program code files stored on the storage device, loaded into one or more memory devices and executed by one or more processors or can be provided from computer program products, for example computer executable instructions, that are stored in a tangible computer-readable storage medium such as RAM, flash drive, hard disk, or optical or magnetic media. When software is used, any suitable programming language or platform can be used to implement the algorithm or technique.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A computer-implemented method for encoding aviation data, the method comprising:
   obtaining, by one or more processors, a first plurality of aviation datasets, the first plurality of aviation datasets respectively descriptive of a plurality of conditions associated with an aircraft at a first time;
   formatting, by the one or more processors, the first plurality of aviation datasets as a first data frame, the first data frame comprising a first plurality of encoding units that have respective positions within the first data frame, wherein each of the first plurality of aviation datasets is formatted as at least one of the first plurality of encoding units;
   determining, by the one or more processors, at least a first period exhibited by at least a first dataset of the first plurality of aviation datasets;
   obtaining, by the one or more processors, a second plurality of aviation datasets, wherein obtaining, by the one or more processors, the second plurality of aviation datasets comprises parsing, by the one or more processors, the first dataset according to the first period to form a second dataset, the second dataset included in the second plurality of aviation datasets, wherein each of the second plurality of aviation datasets corresponds to one of the first plurality of aviation datasets, and wherein the second plurality of aviation datasets respectively describe the plurality of conditions associated with the aircraft at a second time that is subsequent to the first time;
   formatting, by the one or more processors, the second plurality of aviation datasets as a second data frame, the second data frame comprising a second plurality of encoding units that have the respective positions within the second data frame, and wherein each of the second plurality of aviation datasets is formatted as at least one of the second plurality of encoding units that has a same respective position as the corresponding at least one first encoding unit into which the corresponding first aviation dataset was formatted; and
   encoding, by the one or more processors, the first data frame and the second data frame according to an encoding technique that uses motion estimation compression.

2. The computer-implemented method of claim 1, wherein:
   the first plurality of encoding units of the first data frame comprises a first plurality of rows of the first data frame, such that each of the first plurality of aviation datasets is formatted as at least one row of the first data frame; and
   the second plurality of encoding units of the second data frame comprises a second plurality of rows of the second data frame, such that each of the second plurality of aviation datasets is formatted as at least one row of the second data frame that has the same position as the at least one row of the first data frame into which the corresponding first aviation dataset was formatted.

3. The computer-implemented method of claim 1, wherein:
   the first plurality of encoding units of the first data frame comprises a first plurality of sixteen by sixteen macroblocks of the first data frame, such that each of the first plurality of aviation datasets is formatted as at least one sixteen by sixteen macroblock of the first data frame; and
   the second plurality of encoding units of the second data frame comprises a second plurality of sixteen by sixteen macroblocks of the second data frame, such that each of the second plurality of aviation datasets is formatted as at least one sixteen by sixteen macroblock of the second data frame that has the same position as the at least one sixteen by sixteen macroblock of the first data frame into which the corresponding first aviation dataset was formatted.

4. The computer-implemented method of claim 1, wherein:
   the first plurality of encoding units of the first data frame comprises a first plurality of eight by eight blocks of the first data frame, such that each of the first plurality of aviation datasets is formatted as at least one eight by eight block of the first data frame; and
   the second plurality of encoding units of the second data frame comprises a second plurality of eight by eight blocks of the second data frame, such that each of the second plurality of aviation datasets is formatted as at least one eight by eight block of the second data frame that has the same position as the at least one eight by eight block of the first data frame into which the corresponding first aviation dataset was formatted.

5. The computer-implemented method of claim 1, wherein encoding, by the one or more processors, the first data frame and the second data frame according to the encoding technique comprises encoding, by the one or more processors, the first data frame and the second data frame according to at least one of an MPEG-1 encoding technique, an MPEG-2 encoding technique, a JPEG encoding technique, an MP3 encoding technique, an MP4 encoding technique, and an MPEG-4 encoding technique.

6. The computer-implemented method of claim 1, further comprising:
   determining, by the one or more processors, a period exhibited by the first plurality of aviation datasets based at least in part on a speed of an engine of the aircraft;
   wherein obtaining, by the one or more processors, the second plurality of aviation datasets comprises parsing, by the one or more processors, the first plurality of aviation datasets according to the period to form the second plurality of aviation datasets.

7. The computer-implemented method of claim 1, wherein formatting, by the one or more processors, the first plurality of aviation datasets as a first data frame comprises supplementing, by the one or more processors, a first dataset of the first plurality of datasets with filler data to complete a first encoding unit of the first plurality of encoding units into which the first dataset is formatted.

8. The computer-implemented method of claim 1, wherein obtaining, by the one or more processors, the first plurality of aviation datasets comprises obtaining, by the one or more processors, the first plurality of sets of full flight engine data, and wherein obtaining, by the one or more processors, the second plurality of aviation datasets comprises obtaining, by the one or more processors, the second plurality of sets of full flight engine data.

9. The computer-implemented method of claim 1, wherein the method is performed in real-time on the aircraft during flight, the method further comprising:
   transmitting, by the one or more processors, the encoded aviation data from the aircraft to a ground station during flight.

10. A system for encoding aviation data, the system comprising:
   at least one data formatting processor;
   a first non-transitory computer-readable medium that stores instructions that when executed by the at least one data formatting processor cause the data formatting processor to:
      obtain a first plurality of aviation datasets that respectively describe a plurality of conditions associated with an aircraft at a first time;
      configure the first plurality of aviation datasets as a first data frame, the first data frame comprising a first plurality of encoding units that have respective positions within the first data frame, wherein each of the first plurality of aviation datasets is configured as at least one of the first plurality of encoding units;
      determine at least a first period exhibited by at least a first dataset of the first plurality of aviation datasets; and
      obtain a second plurality of aviation datasets, wherein each of the second plurality of aviation datasets corresponds to one of the first plurality of aviation datasets, and wherein the second plurality of aviation datasets respectively describe the plurality of conditions associated with the aircraft at a second time that is subsequent to the first time;
      parse the first dataset according to the first period to form a second dataset, the second dataset included in the second plurality of aviation datasets; and
      configure the second plurality of aviation datasets as a second data frame, the second data frame comprising a second plurality of encoding units that have the respective positions within the second data frame, and wherein each of the second plurality of aviation datasets is configured as at least one of the second plurality of encoding units that has a same respective position as the corresponding at least one first encoding unit into which the corresponding first aviation dataset was configured; and
   at least one data encoding processor operable to encode the first data frame and the second data frame according to an encoding technique that uses motion estimation compression.

11. The system of claim 10, wherein the encoding technique comprises at least one of an MPEG-2 encoding technique, an MPEG-1 encoding technique, a JPEG encoding technique, an MP3 encoding technique, an MP4 encoding technique, and an MPEG-4 encoding technique.

12. The system of claim 10, wherein to configure the first plurality of aviation datasets as the first data frame, the at least one data formatting processor supplements a first dataset of the first plurality of datasets with filler data to complete a first encoding unit of the first plurality of encoding units into which the first dataset is configured.

13. The system of claim 10, wherein the system is on-board the aircraft and operates in real-time during flight.

14. A non-transitory computer-readable medium that stores instructions that when executed by one or more processors cause the one or more processors to:
   obtain a plurality of aviation datasets that respectively describe a plurality of conditions associated with an aircraft;
   determine at least a first period exhibited by at least a first dataset of the plurality of aviation datasets;
   parse the first dataset according to the first period to obtain a plurality of first subsets;
   format the plurality of aviation datasets into a plurality of video frames, each of the plurality of video frames comprising a plurality of encoding units at respective positions within such video frame;
   wherein to format the plurality of aviation datasets into the plurality of video frames the one or more processors respectively format the plurality of first subsets within the plurality of video frames, such that each video frame contains a respective one of the plurality of first subsets;
   wherein to format the plurality of aviation datasets into the plurality of video frames the one or more processors format at least a portion of each of the plurality of aviation datasets as at least one of the plurality of encoding units within each video frame; and
   wherein, for each of the plurality of aviation datasets, the at least one encoding unit within each video frame is at a same respective position from frame to frame; and
   cause the one or more processors to encode the plurality of video frames according to a video encoding technique that uses motion estimation compression.

* * * * *